(12) United States Patent
Harada et al.

(10) Patent No.: US 9,052,242 B2
(45) Date of Patent: Jun. 9, 2015

(54) DEVICE AND METHOD FOR MEASURING SURFACE TEMPERATURE OF CAST PIECE

(75) Inventors: Hiroshi Harada, Tokyo (JP); Masanori Yamana, Tokyo (JP); Atsushi Saida, Tokyo (JP); Masaki Nagashima, Tokyo (JP); Tomohiro Konno, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 697 days.

(21) Appl. No.: 13/264,056

(22) PCT Filed: Jan. 8, 2010

(86) PCT No.: PCT/JP2010/000081
§ 371 (c)(1),
(2), (4) Date: Oct. 12, 2011

(87) PCT Pub. No.: WO2010/119594
PCT Pub. Date: Oct. 21, 2010

(65) Prior Publication Data
US 2012/0038353 A1  Feb. 16, 2012

(30) Foreign Application Priority Data

Apr. 16, 2009  (JP) ................. P2009-099994

(51) Int. Cl.
  *G01K 7/00*  (2006.01)
  *G01K 7/02*  (2006.01)
  (Continued)

(52) U.S. Cl.
  CPC ........ *G01K 7/38* (2013.01); *B22D 2/006* (2013.01); *G01K 2217/00* (2013.01)

(58) Field of Classification Search
  CPC .............. G01R 19/16571; G01R 29/0871;
    G01R 33/02; G01R 33/09; G01R 33/06;
    G01R 33/063; G01R 33/066; G01R 33/07;
    G01R 33/077; G01R 33/072; G01R 33/12;
    G01R 33/20; G01R 33/22; G01R 33/028;
    G01R 33/0283; G01R 33/04; G01R 33/045;
    G01R 33/14; G01R 33/24; G01R 33/243;
    G01R 33/0064; G01R 33/0206; G01R
    33/0011; G01R 33/0017; G01R 33/3607;
    G01R 33/34053; G01R 33/341; G01R
    33/0005; G01R 33/023; G01R 33/0029;
    G01R 33/0041; G01R 33/246; G01R 33/32;
    G01R 33/36; G01R 33/323; G01R 15/12;
    G01R 15/20; G01R 21/08; G01R 27/26;
    G01R 29/08; G01R 29/12; G01R 19/20;
    G01R 19/16509; G01R 15/207; G01R 15/205;
    G01R 15/246; G01R 15/185; G01R 15/14;
    G01K 7/006; G01K 7/36; G01K 7/203;
    G01K 7/245
  USPC .......... 374/132, 163, 174, 176, 100, 141, 183,
    374/184, 139, 179; 73/770, 290 R; 164/451,
    164/454, 461, 150.1; 324/222, 228, 200,
    324/209, 230, 232, 239, 207.17, 227,
    324/207.12
  See application file for complete search history.

(56) References Cited

U.S. PATENT DOCUMENTS 2,301,902 A * 11/1942 Merle ........................... 164/461
2,635,468 A *  4/1953 Field et al. .................... 374/132
(Continued)

FOREIGN PATENT DOCUMENTS

JP         54-61031 A    5/1979
JP         56-7456 B2    2/1981
(Continued)

OTHER PUBLICATIONS

Canadian Office Action for Canadian Application No. 2,758,135 dated Oct. 1, 2013.
(Continued)

*Primary Examiner* — Gail Kaplan Verbitsky
(74) *Attorney, Agent, or Firm* — Birch, Stewart, Kolasch & Birch, LLP

(57) ABSTRACT

A cast piece surface temperature measuring device includes: a magnetic field exciting device which applies an AC magnetic field substantially perpendicular to a surface of a cast piece; a magnetic field detecting device which detects the AC magnetic field to detect a magnetic flux varied in response to a surface temperature of the cast piece; and a surface temperature deriving device which derives the surface temperature of the cast piece based on an induced electromotive force obtained by detecting the AC magnetic field by the magnetic field detecting device and a predetermined relation data. The magnetic field exciting device includes a solenoidal excitation coil, the magnetic field detecting device includes a solenoidal detection coil interposed between the surface of the cast piece and the excitation coil, and the relation data indicates a correspondence relationship between the surface temperature of the cast piece and the induced electromotive force in a temperature range including a predetermined Curie point.

8 Claims, 5 Drawing Sheets

(51) Int. Cl.
  *G01K 11/00* (2006.01)
  *G01K 7/38* (2006.01)
  *B22D 2/00* (2006.01)

(56) References Cited

U.S. PATENT DOCUMENTS

| | | | |
|---|---|---|---|
| 4,112,759 A * | 9/1978 | Mizuno et al. | 73/295 |
| 4,534,405 A * | 8/1985 | Hulek et al. | 164/451 |
| 4,596,150 A | 6/1986 | Kuhr | |
| 4,647,854 A * | 3/1987 | Yamada et al. | 324/207.12 |
| 4,693,299 A * | 9/1987 | Kuznetsov et al. | 164/502 |
| 4,741,383 A * | 5/1988 | Hull et al. | 164/467 |
| 4,757,259 A * | 7/1988 | Charpentier | 324/227 |
| 5,951,163 A * | 9/1999 | Jen et al. | 374/119 |
| 6,538,433 B1 * | 3/2003 | Cervantes et al. | 324/228 |
| 6,803,757 B2 * | 10/2004 | Slates | 324/207.17 |
| 7,282,909 B2 * | 10/2007 | Bailey, III | 324/230 |
| 7,740,051 B2 * | 6/2010 | Iizuka et al. | 164/451 |
| 2003/0141036 A1 * | 7/2003 | Iizuka et al. | 164/454 |
| 2008/0282792 A1 * | 11/2008 | De Monte et al. | 73/290 R |

FOREIGN PATENT DOCUMENTS

| | | | |
|---|---|---|---|
| JP | 2-168130 A | | 6/1990 |
| JP | 5-223653 A | | 8/1993 |
| JP | 10175047 A | * | 6/1998 |
| JP | 10263771 A | * | 10/1998 |
| JP | 2008-256605 A | | 10/2008 |
| JP | 2008256605 A | * | 10/2008 |

OTHER PUBLICATIONS

PCT/ISA/210—International Search Report mailed Apr. 6, 2010 for PCT/JP2010/000081.

* cited by examiner

DEVICE AND METHOD FOR MEASURING SURFACE TEMPERATURE OF CAST PIECE

TECHNICAL FIELD

The present invention relates to a device and method for measuring the surface temperature of a cast piece, which is capable of stably measuring the surface temperature of the cast piece for a long time even under severe conditions.

Priority is claimed on Japanese Patent Application No. 2009-099994, filed Apr. 16, 2009, the content of which is incorporated herein by reference.

BACKGROUND ART

In the field of slab continuous casting, casting of high-quality cast pieces of good surface and interior quality with high productivity requires prevention of operation trouble such as break-out. Break-out may be prevented as described below.

When a solidifying shell is completely sticked to the surface of a copper plate in a mold, the temperature of the solidifying shell decreases to the Curie point. Therefore, drawing of cast pieces may be temporarily stopped by detecting a decrease of the solidifying shell temperature to the Curie point to detect the sticking of the solidifying shell. Particularly, by applying a direct current magnetic field to the cast pieces in the mold to magnetize the solidifying shell and detecting a change in its line of magnetic force, it is possible to detect whether or not the temperature of the solidifying shell is decreased to the Curie point (for example see Patent Document 1).

CITATION LIST

Patent Document

[Patent Document 1] Japanese Examined Patent Application, Second Publication No. S56-7456 (Claims)

SUMMARY OF INVENTION

Technical Problem

However, if an unbalanced flow in a continuous casting (CC) mold occurs and thus the solidifying shell is remarkably remelted when the discharged flow from nozzle impinges on the solidifying shell, a local thickness of the solidifying shell is insufficient. This may cause operation trouble which is called "break-out." Such operation trouble may not be sufficiently prevented by the method of detecting a decrease in the temperature of the solidifying shell to the Curie point, as described above. That is, the break-out may be avoided if the surface temperature of cast pieces can be precisely measured to control the surface of cast pieces to have an appropriate temperature. Thus, methods of measuring the surface temperature of cast pieces will be described below.

First, there is a method for measuring the surface temperature of cast pieces using a radiation thermometer. However, this measuring method using the radiation thermometer has a restriction depending on a measurement position. Specifically, this method requires not including vapor or water in an atmosphere between the measurement position and the radiation thermometer, or otherwise, if any vapor or water is present, requires performing the measurement while flowing out the vapor or water in the front of the radiation thermometer using high pressure air to prevent the measurement from being affected by the vapor or water.

Using the above-mentioned radiation thermometer to prevent the break-out requires management of the surface temperature of cast pieces immediately under the mold. That is, the measurement of the surface temperature of cast pieces immediately under the mold using the radiation thermometer disposed immediately under the mold allows for detection of increase of the surface temperature of cast pieces to such an extent as to produce the break-out, which may result in prevention of the break-out in advance. However, since the cast pieces are cooled by a great quantity of water immediately under the mold, the space defined between the radiation thermometer and the cast pieces is under severe conditions where great quantities of water, vapor, powder, scales and so on are scattered. This makes it extremely difficult to make precise measurement of the surface temperature of cast pieces with a radiation thermometer even when high pressure air is used.

Another radiation thermometer has been devised which uses a short wavelength range of equal to or less than 1 μm, which is believed to be relatively robust in such severe conditions. However, even using this radiation thermometer, it is difficult to make stable measurement due to scatter in measurement data.

Another method for measuring the surface temperature of case pieces is to monitor a change in the surface temperature of cast pieces using a plurality of thermocouples installed into a mold copper plate. However, this method also makes it difficult to make precise measurement of the surface temperature of cast pieces due to an air gap formed between the surface of cast pieces and the mold copper plate under the mold, although a change in the surface temperature of cast pieces near the meniscus level in the mold may be measured with high sensitivity.

In the light of such circumstances, it is an object of the present invention to provide a device and method for measuring the surface temperature of a cast piece, which is capable of stably measuring the surface temperature of the cast piece for a long time even under severe conditions where a great quantity of water, vapor and so on exists.

Solution to Problem

To overcome the above problems and achieve the above object, the present invention provides the following:

(1) A cast piece surface temperature measuring device includes: a magnetic field exciting device which applies an AC magnetic field substantially perpendicular to a surface of a cast piece; a magnetic field detecting device which detects the AC magnetic field to detect a magnetic flux varied in response to a surface temperature of the cast piece; and a surface temperature deriving device which derives the surface temperature of the cast piece based on an induced electromotive force obtained by detecting the AC magnetic field by the magnetic field detecting device and a predetermined relation data, wherein the magnetic field exciting device includes a solenoidal excitation coil, the magnetic field detecting device includes a solenoidal detection coil interposed between the surface of the cast piece and the excitation coil, and the relation data indicates a correspondence relationship between the surface temperature of the cast piece and the induced electromotive force in a temperature range including a predetermined Curie point.

According to the above cast piece surface temperature measuring device, the arrangement of the detection coil between the cast piece surface and the excitation coil may exclude an effect by a low temperature portion near a corner of the cast piece. As a result, it is possible to measure the cast piece surface temperature with higher precision in the front of the detection coil, that is, near the center of the narrow face of the cast piece.

In addition, the lower limit of the cast piece surface temperature in the relation data is the Curie point minus 200° C. or so and the upper limit thereof is the Curie point plus 100° C. or so. The reason for this is the dependency of steel magnetic property on temperature (that steel is changed to be ferromagnetic in the range of from the room temperature to the Curie point, paramagnetic above the Curie point, and nonmagnetic at even higher temperatures). That is, if a region with the magnetic field applied is nonmagnetic, a magnetic flux is not varied irrespective of application of the magnetic field. If the region with the magnetic field applied decreases in temperature to be paramagnetic or ferromagnetic, the magnetic flux is varied as the magnetic flux is concentrated on that region. In addition, the variation of the magnetic flux is remarkable under ferromagnetic conditions. However, if the region with the magnetic field applied is ferromagnetic and magnetically-saturated, no voltage change is observed as the magnetic flux is no longer varied. Therefore, once the region is magnetically-saturated, the variation of the magnetic flux, that is, the voltage change can be observed even when the temperature of that region further decreases. In this manner, the upper and lower limits of the temperature to be measured are determined.

(2) In the cast piece surface temperature measuring device of Item (1), the relation data may be an equation which indicates the correspondence relationship between the surface temperature of the cast piece and the induced electromotive force.

(3) In the cast piece surface temperature measuring device of Item (1), the cast piece may be a slab obtained through a continuous casting by drawing the slab from a bottom of a mold, and the magnetic field exciting device and the magnetic field detecting device may be arranged in a narrow face of the cast piece immediately under the mold and below a cooling zone to cool the narrow face of the cast piece.

In this case, it is possible to first decrease the cast piece surface temperature down to the Curie point or below in the cooling zone to cool the narrow face of the cast piece and, immediately after that, to measure the surface temperature of a portion in which the surface temperature of the cast piece increases by recuperated heat.

(4) In the cast piece surface temperature measuring device of Item (1), an application frequency of the magnetic field excited by the magnetic field exciting device is preferably equal to or more than 0.5 Hz and equal to or less than 20 Hz.

(5) As a cast piece surface temperature measuring method which measures a surface temperature of a cast piece using the cast piece surface temperature measuring device of Items (1), the method includes: applying the AC magnetic field to the cast piece by the magnetic field exciting device and detecting the AC magnetic field by the magnetic field detecting device; and deriving the surface temperature of the cast piece by the surface temperature deriving device.

Advantageous Effects of Invention

As described above, according to the cast piece surface temperature measuring device and method of the present invention, it is possible to measure the surface temperature of a cast piece stably for a long time even under severe conditions where a great quantity of water, vapor and so on exists.

DESCRIPTION OF EMBODIMENTS

Hereinafter, a device and method for measuring the surface temperature of a cast piece according to one embodiment will be described with reference to the drawings.

This embodiment involves a device and a method for measuring the surface temperature of a cast piece immediately under a mold having an inner rectangular space in a process of continuously casting a slab drawn from below using the mold.

Figure 1:
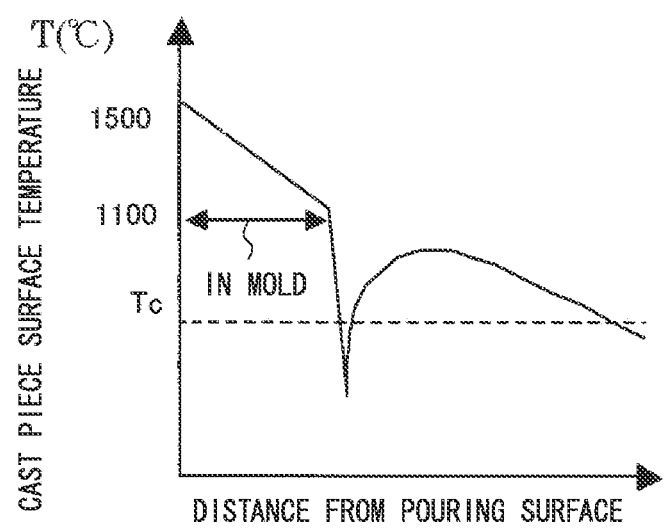
FIG. 1 is a graph showing a relationship between a distance from a pouring surface and slab surface temperature in a process of continuously casting a slab drawn from a bottom of a mold while strongly cooling a narrow side of a cast piece immediately under a mold.

A cast piece is supported by many rolls up to near a position at which the cast piece drawn from immediately under the mold is finally solidified in the lower part of a broad face of the mold, whereas another cast piece is merely supported by few rolls provided immediately under the mold in the lower part of a narrow face of the mold. Accordingly, although the broad face of the cast piece may be cooled by nozzle tips for cooling disposed between the rolls up to a position at which solidification is completed, it is necessary to secure a solidifying shell thickness endurable against static pressure of molten steel in the narrow face of the cast piece by decreasing the surface temperature within a range of from immediately under the mold to a position at which the rolls are provided. Accordingly, the narrow face of the cast piece immediately under the mold is strongly cooled with water or the like, and a change in the cast piece surface temperature, which is caused by the strong cooling, has a temperature pattern as schematically shown in FIG. 1. It is noted in FIG. 1 that the cast piece surface temperature first decreases to the Curie point Tc or below by the strong cooling in the narrow face of the cast piece and then increases by recuperated heat. The Curie point is a magnetic transformation point. Steel is changed to a ferromagnetic substance in the range from room temperature to the Curie point, a paramagnetic substance above the Curie point, and a nonmagnetic substance at an even higher temperature. In this embodiment, the cast piece surface temperature is measured using a temperature sensor based on this property.

Figure 2A:
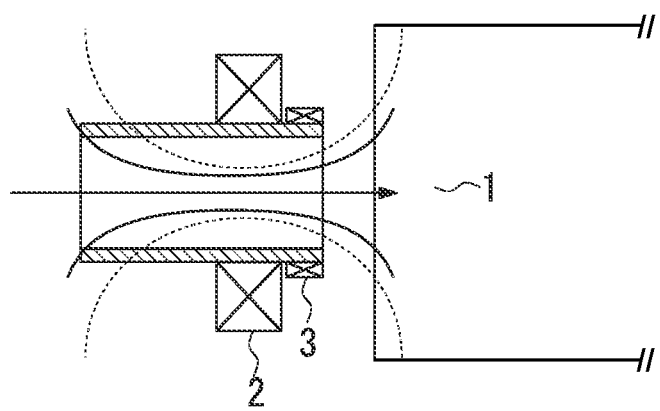
FIG. 2A is a schematic diagram used to explain the basic principle of measurement of the surface temperature of a cast piece.
Figure 2B:
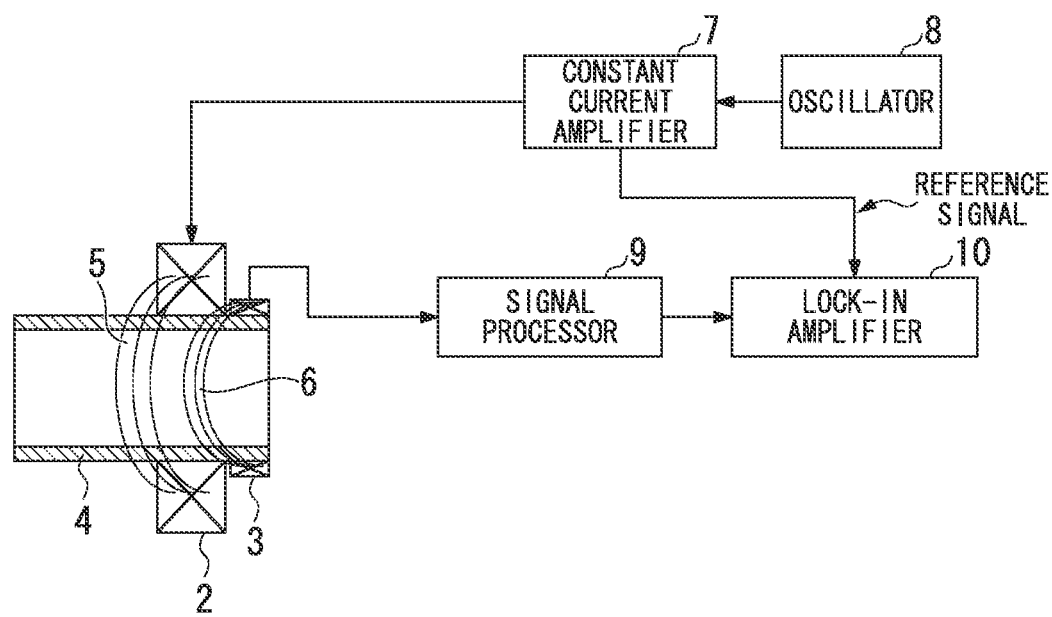
FIG. 2B is a block diagram showing a configuration of a cast piece surface temperature measuring device according to one embodiment of the invention.

FIG. 2A is a schematic diagram used to explain the basic principle of measurement of the cast piece surface temperature and FIG. 2B is a block diagram showing a configuration of a cast piece surface temperature measuring device according to this embodiment.

The basic principle of measurement of the cast piece surface temperature will be described below with reference to FIG. 2A.

First, a vertical magnetic field is applied to a surface of a cast piece 1 by an excitation coil 2. Then, as a magnetic flux is changed by the surface temperature of the cast piece 1, the change in the magnetic force line is detected by a detection coil 3. Then, the temperature of the cast piece 1 may be measured using an induced electromotive force obtained by this detection and a relationship between a predetermined cast piece surface temperature and the induced electromotive force.

As shown in FIG. 2A, the cast piece surface temperature measuring device according to this embodiment includes, as main components, a solenoidal excitation coil 2 which applies an AC magnetic field to the surface of the cast piece 1; a solenoidal detection coil 3 which detects a change in magnetic flux; and calculating device (not shown) for calculating the cast piece surface temperature using the relationship between the predetermined cast piece surface temperature and the induced electromotive force.

The detection coil 3 is disposed ahead of the excitation coil 2 (that is, between the surface of the cast piece 1 and the excitation coil 2), the reasons for which will be described later.

As shown in FIG. 2B, the excitation coil 2 is formed by winding a polyester-coated copper line 5 having a 1 mm outer diameter around a glass epoxy-based pipe 4 having a 30 mm outer diameter by 500 turns. In addition, the detection coil 3 is formed by winding a polyester-coated copper line 6 having a 0.3 mm outer diameter around the glass epoxy-based pipe 4 by 40 turns. In addition, a coil device set including the excitation coil 2 and the detection coil 3 is accommodated, as a sensor, in a cylindrical stainless steel case (not shown). This cylindrical case is under a condition of being forced to be cooled by dry air supplied from a device (not shown).

The excitation coil 2 is connected via a wire to a constant current amplifier 7 which is then connected to an oscillator 8.

The detection coil 3 is connected via a wire to a signal processor 9. The signal processor 9 includes an operational (OP) amplifier, resistors, capacitors and so on and has a voltage amplification function and a filter processing function such as a low pass filter, a band pass filter or the like. The signal processor 9 is connected to a lock-in amplifier 10. The lock-in amplifier 10 is an analog device which can receive, as a reference signal, a signal having a frequency of 1.5 Hz from the constant current amplifier 7, output a voltage having the same frequency, and detect a difference in phase between the voltage and the reference signal.

The functions of the signal processor 9 and the lock-in amplifier 10 may be replaced with a function of a personal computer (PC) (not shown). In this case, a signal (a change in magnetic flux) detected by the detection coil 3 is received by the PC via an AD converter and the functions of the signal processor 9 and the function of lock-in amplifier 10 may be implemented with program software.

The cast piece surface temperature measuring device is set to the bottom of the mold block for the narrow face of slab if the cast piece below a cooling zone which strongly cools the narrow face of the cast piece 1 immediately under the mold. The reason for setting the device below the cooling zone is to cool the cast piece 1 temporarily until the cast piece surface temperature reaches the Curie point or below in the cooling zone immediately under the mold and, immediately after that, to measure the surface temperature of a portion in which the surface temperature increases by recuperated heat. In addition, it is preferable that the cast piece surface temperature measuring device is disposed in such a manner that the center of the inner (or outer) diameter of the glass epoxy-based pipe 4 faces the center of the narrow face of the cast piece 1, as shown in FIGS. 2A and 2B.

In the cast piece surface temperature measuring device, the oscillator 8 generates an AC signal having a frequency of 1.5 Hz and the constant current amplifier 7 amplifies the AC signal to a different AC signal having a certain magnitude to be applied to the excitation coil 2. As a result, the excitation coil 2 provides an alternating magnetic flux $\phi$ to the cast piece 1. That is, the excitation coil 2 applies an AC magnetic field substantially perpendicular to the narrow face of the cast piece. If the surface of the cast piece 1 includes a non-magnetic substance, the magnetic field is expanded into the inside of the cast piece 1 as in vacuo, as indicated by a broken line in FIG. 2A. If the surface of the cast piece 1 includes a magnetic substance, a magnetic field is concentrated on the magnetic substance, thereby significantly changing the magnetic flux, as indicated by a solid line in FIG. 2A. Such a change in the magnetic flux is defined by the surface temperature of the cast piece 1, i.e., its magnetic permeability. Thus, the change in the magnetic flux is detected by the detection coil 3.

The detection of the change in the magnetic flux by the detection coil 3 will be described in detail below.

An AC voltage of $N \times d\phi c/dt$ (where, N is the number of turns of the detection coil 3, $\phi c$ is the number of magnetic flux linkages of the detection coil 3 and t is time) is induced in the detection coil 3. With its noise removed by a 5 Hz low pass filter in the signal processor 9, the AC voltage is processed by the lock-in amplifier 10 to detect a voltage value having a frequency component of 1.5 Hz. That is, when a distribution of the alternating magnetic flux $\phi$ is changed by the surface temperature of the cast piece 1, the magnetic flux linkage number $\phi c$ of the detection coil 3 and the AC voltage induced in the detection coil 3 can be accordingly changed and detected. Then, the calculating device calculates the surface temperature of the cast piece 1 based on the induced electromotive force obtained by detecting the change in the magnetic flux by the detection coil 3 and the above-mentioned relationship. Thus, it is possible to measure the surface temperature of the cast piece 1.

As described with the above-described basic principle, to make measurement of the cast piece surface temperature with the cast piece surface temperature measuring device according to this embodiment, it is required to predetermine the relationship between the cast piece surface temperature and the induced electromotive force (or the voltage detected by the detection coil 3). Thus, contents and results of an experiment which is carried out to introduce one example of the relationship will be described below.

Figure 3:
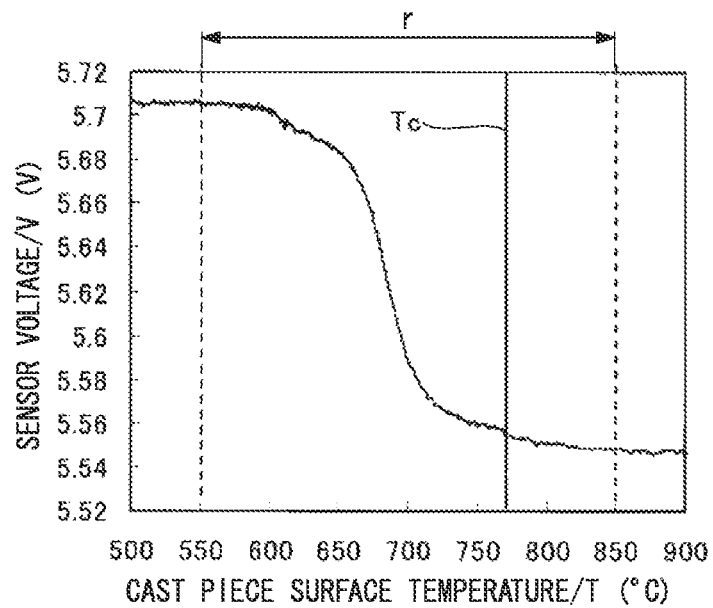
FIG. 3 is a graph showing a relationship between the cast piece surface temperature and a sensor voltage.
Figure 4:
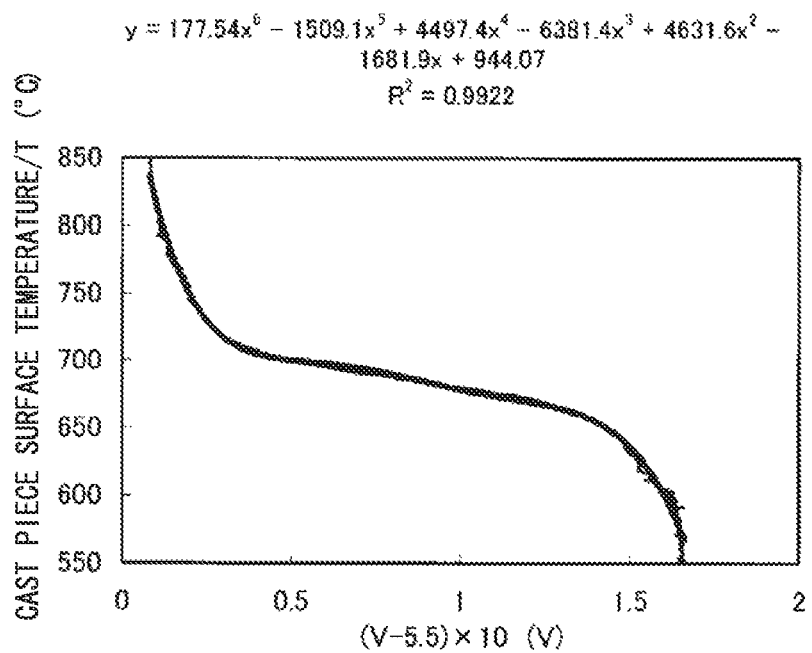
FIG. 4 is a graph showing a relationship between the cast piece surface temperature and a sensor voltage in a temperature range of from 550° C. to 850° C. which is shown in FIG. 3.

FIG. 3 is a graph showing the relationship between a cast piece temperature (the cast piece surface temperature) and a voltage (detected by the detection coil 3). FIG. 4 is a graph showing the relationship between the cast piece surface temperature and a sensor voltage in a temperature range of from 550° C. to 850° C. which is shown in FIG. 3. This relationship (between the voltage and the cast piece surface temperature) is as shown in the following equation (1).

In the equation (1), x is a value corresponding to a decuple of the difference between a voltage value V detected by the detection coil 3 and a voltage of 5.54 V in a non-magnetic temperature range, y is the cast piece surface temperature (° C.) and R is a correlation coefficient.

$$y=177.54x^6-1509.1x^5+4497.4x^4-6381.4x^3+4631.6x^2-1681.9x+944.07$$

$$R^2=0.9922 \quad (1)$$

In this experiment, a cast piece sample was heated to about 1200° C. using a heating furnace and the cast piece surface temperature measuring device shown in FIG. 2B was placed to apply a magnetic field perpendicular to the surface of the heated cast piece sample. In addition, the cast piece surface temperature measuring device was fixed at a position to set the distance between the glass epoxy-based pipe 4 and the surface of the cast piece sample to 30 mm. In addition, a thermocouple was embedded in the cast piece sample at a depth of 1 mm and the temperature of the cast piece sample was measured. The results of the measurement are shown in FIG. 3.

It can be seen from FIG. 3 that a voltage detected by the detection coil 3 (the sensor voltage) is changed in a temperature range r including the Curie point Tc while the voltage is substantially constant in a higher temperature range. For the temperature range r in which a voltage is changed, the relationship between a cast piece surface temperature and a voltage may be obtained according to the above equation (1) through polynomial approximation, for example as shown in FIG. 4. This indicates that the cast piece surface temperature measuring device according to this embodiment has the ability to detect a change in magnetic characteristics with high sensitivity in the temperature range r including the Curie point Tc. That is, it is found out from the results of this experiment that the temperature measuring device can be utilized as a thermometer for the cast surface in a temperature range of from the Curie point Tc minus about 200° C. to the Curie point Tc plus about 100° C., for example.

In addition, for the temperature range in which a voltage is suddenly changed, the temperature versus voltage relationship may be obtained according to the above equation (1) through polynomial approximation, for example as shown in FIG. 4. This indicates that the cast piece surface temperature measuring device according to this embodiment has the ability to detect a change in magnetic characteristics of the cast piece surface near the Curie point Tc with high sensitivity, which means that the temperature measuring device can be utilized as a thermometer for the cast surface in a temperature range of from the Curie point Tc minus about 200° C. to the Curie point Tc plus about 100° C., for example.

Next, when the surface temperature for the narrow side of the cast piece is measured, it is preferable to measure the surface temperature for the center of the narrow side as far as possible since break-out due to the discharged flow from nozzles depends on the surface temperature of the center of the narrow side.

However, since any bit of the AC magnetic field of the excitation coil reaches up to the corner of the cast piece, the voltage of the detection coil is changed by the temperature of the corner of the cast piece, which may act as a disturbance factor. In general, as the corner of the cast piece is cooled at higher extraction rate, the surface temperature in the corner area becomes lower than the one in the center of the narrow side. Accordingly, since the corner of the cast piece has higher relative permeability than the center of the narrow side, a bit of the AC magnetic field being excited causes a change in the voltage of the detection coil due to the change in the temperature of the corner of the cast piece. In addition, the corner is cooled by cooling water ejected from nozzle tips interposed between the rolls at the broad face of the cast piece and has varying temperature even according to cooling conditions of the broad side, which may result in a change in the voltage of the detection coil. Accordingly, it is preferable that the change in the voltage of the detection coil due to the change in the temperature of the corner of the cast piece is as small as possible.

Figure 6A:
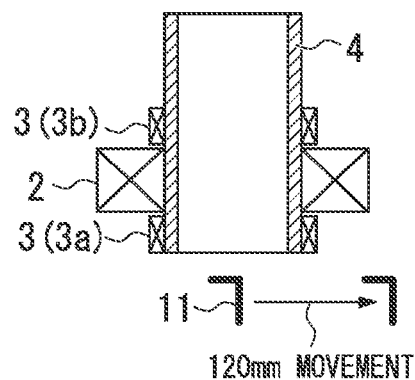
FIG. 6A is a schematic diagram showing an experiment of checking a voltage change at a cast piece corner by a difference in arrangement of the excitation coil.

On that account, as shown in FIG. 6A, when the detection coil 3 was placed in the front of the excitation coil 2 (i.e., placed as denoted by reference numeral 3(3a) in FIG. 6A, which is hereinafter referred to as "front placement") or the rear thereof (i.e., placed as denoted by reference numeral 3(3b) in FIG. 6A, which is hereinafter referred to as "rear placement") with respect to the cast piece (not shown in this figure although it is placed below the glass epoxy-based pipe 4), we examined how the voltage of the detection coil 3 is affected by the corner of the cast piece.

In the experiment, when an iron angle 11 was placed at a position distant by 30 mm from the detection coil 3 on a central line of the detection coil 3 (that is, a central axial line of the diameter of the glass epoxy-based pipe 4) as a sensor, measured voltages ($\Delta V$ center) of the detection coil 3 were compared under two conditions.

Figure 6B:
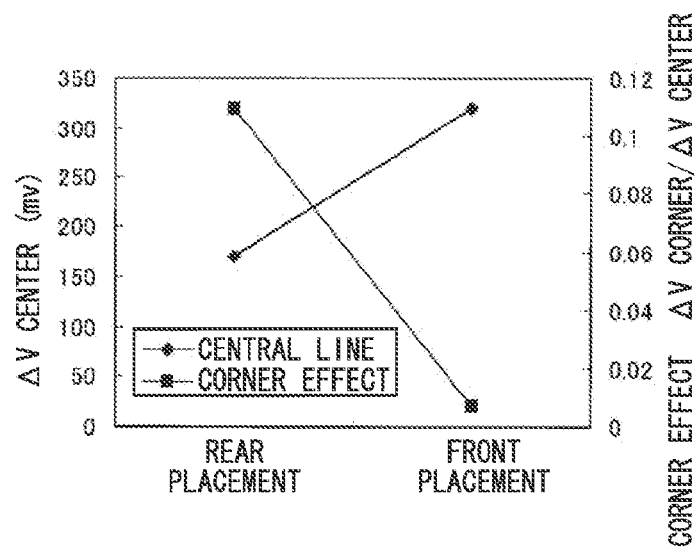
FIG. 6B is a graph showing the results of the experiment of checking a voltage change at a cast piece corner by a difference in arrangement of the excitation coil.

Next, the iron angle 11 was moved to a position corresponding to the corner of the cast piece, that is, a position distant by 120 mm from the central axial line of the detection coil 3 in the radial direction, a voltage value ($\Delta V$ corner) of the detection coil 3 was measured, and a value which is a division of this voltage value ($\Delta V$ corner) by the first measured voltage value ($\Delta V$ center), i.e. ($\Delta V$ corner/$\Delta V$ center), was obtained. The results of the experiment are shown by a graph in FIG. 6B. It can be seen from this graph that the voltage value ($\Delta V$ center) measured when the angle 11 was placed on the central axial line is about twice higher in the front placement of the detection coil 3 than in the rear placement thereof. This indicates a great change in a magnetic flux in the center of the narrow side, that is, high sensitivity to the temperature change.

On the other hand, it can be seen from this graph that a ratio of the voltage value ($\Delta V$ corner) measured when the angle 11 was placed on the position corresponding to the corner of the cast piece to the voltage value ($\Delta V$ center) measured when the angle 11 was placed on the central axial line (the ratio being represented by "corner effect" in FIG. 6B) decreases to about $\frac{1}{10}$ in the front placement of the detection coil 3, as compared to the rear placement thereof. This indicates that the change in the voltage of the detection coil 3 due to the change in the temperature of the corner of the cast piece can be reduced in the front placement of the detection coil 3, thereby allowing for measurement of the surface temperature of the center of the narrow side with high sensitivity. The reason for the reduction of the effect of the cast piece corner in the front placement of the detection coil 3 is that a change in magnetic flux linkage in the detection coil 3 when the angle 11 is placed in the position corresponding to the corner of the cast piece is smaller than when the angle 11 is placed in the front side.

The result of the experiment showed that the surface temperature of the center of the narrow side of the cast piece could be measured with higher precision in the front placement of the detection coil 3 between the cast piece and the excitation coil 2 than in the rear placement thereof.

Figure 5:
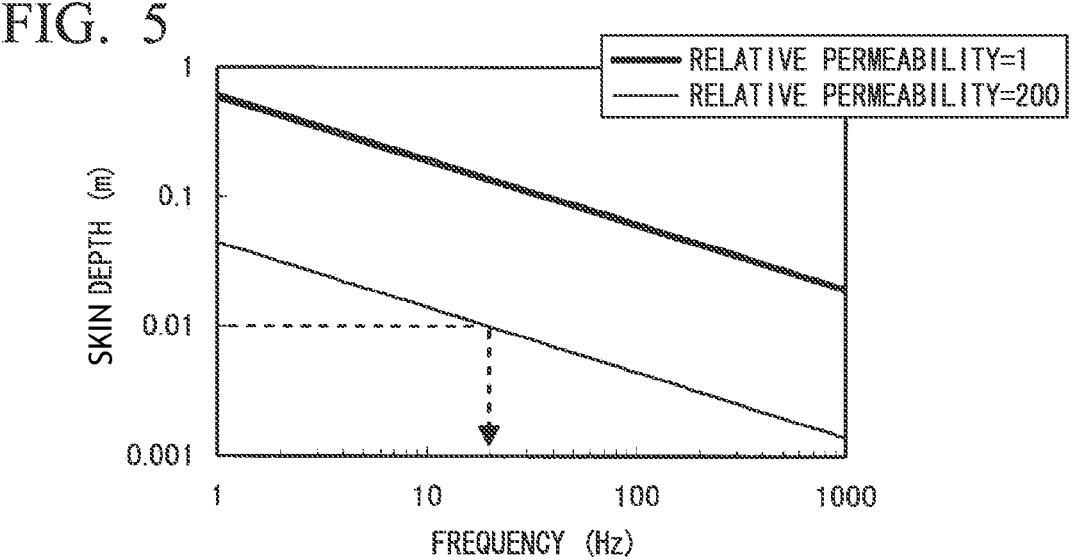
FIG. 5 is a graph showing a relationship between a frequency applied to an excitation coil and skin depth.

The frequency which is generated by the oscillator 8 and applied to the excitation coil 2 is preferably equal to or more than 0.5 Hz and equal to or less than 20 Hz. If the frequency is below 0.5 Hz, a time constant of equal to or more than one minute is required when a signal sent from the detection coil 3 is detected, which may result in decreased response speed of the cast piece surface temperature measuring device. On the other hand, if the frequency is above 20 Hz, skin depth, which is a depth by which a magnetic field penetrates, becomes small, whereby the magnetic field is more concentrated on the cast piece surface. As shown in FIG. 5, the skin depth at the frequency up to 20 Hz can be secured to 10 mm (0.01 m) or so even for a relative permeability of about 200. This means that it is preferable to secure the skin depth to 10 mm or so since the cast piece surface has unevenness such as oscillation marks and further the distance between the cast piece surface and the cast piece surface temperature measuring device is delicately varied due to bulging or the like, which may result in higher susceptibility to a higher frequency. Accordingly, the upper limit of the frequency is preferably 20 Hz.

Example

With the detection coil 3 placed in the front of the excitation coil 2, that is, between the excitation coil 2 and the cast piece surface, an experiment was carried out to check effectiveness of the cast piece surface temperature measuring device. Experiment conditions used are as listed below.
(Experiment Conditions)
  Cast piece width: 1000~1800 mm
  Casting speed: 0.75~1.2 m/min
  Steel used: medium carbon aluminum-killed steel
  Sensor position (position of the cast piece surface temperature measuring device): 1 m below a pouring surface level in a mold and immediately below a cast narrow side cooling zone
  Distance between the sensor (leading end of the detection coil 3 of the piece surface temperature measuring device) and the cast piece surface: 30 mm
  Frequency of alternating current applied to the excitation coil 2: 1.5 Hz
  In this example, the cast piece surface temperature measuring device is installed just below the narrow side mold. This makes it possible to keep the distance between the piece surface temperature measuring device and the cast piece surface substantially constant (that is, allow the excitation coil 2 to generate a substantially-constant AC magnetic field applied substantially perpendicular to the surface of the narrow side of the cast piece) even when the mold is modified to provide different cast piece widths.

Figure 7A:
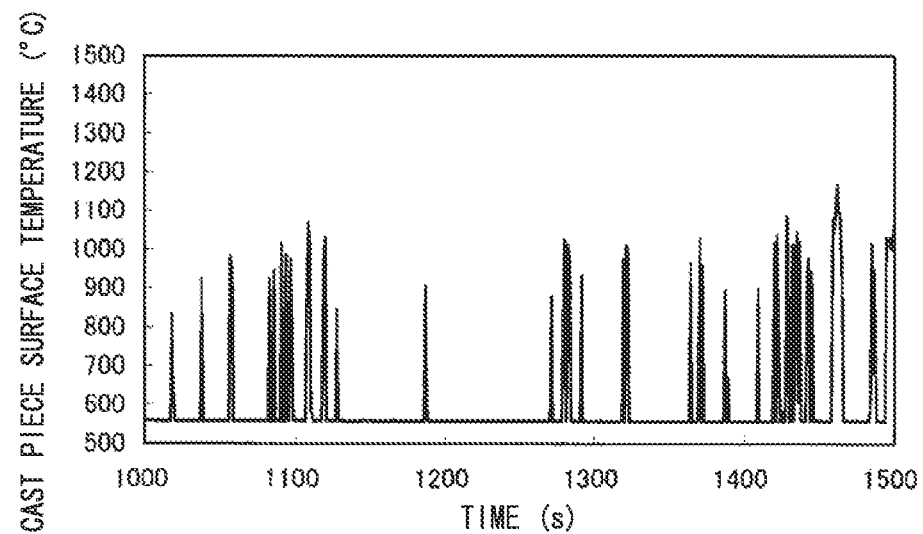
FIG. 7A is a graph showing the results of measurement of a comparative experiment and showing a relationship between measurement time and the cast piece surface temperature.
Figure 7B:
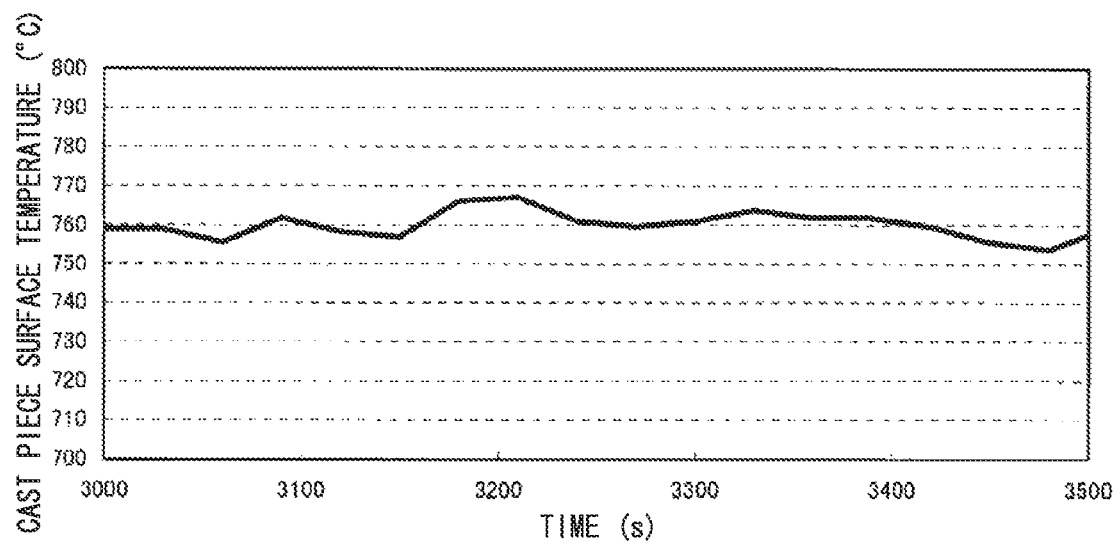
FIG. 7B is a graph showing the results of measurement of an example and showing a relationship between measurement time and the cast piece surface temperature.

FIG. 7A is a graph showing the results of temperature measurements of a comparative experiment carried out with a conventional radiation thermometer instead of the inventive piece surface temperature measuring device under the same experiment conditions and showing a relationship between measurement time and the cast piece surface temperature. FIG. 7B is a graph showing an example of the results of temperature measurements form the same experiment carried out with the inventive piece surface temperature measuring device under the same experimental conditions showing a relationship between measurement time and the cast piece surface temperature.

As shown in FIG. 7A, the comparative example showed that measurement values were scattered so wide as not to measure the cast piece surface temperature precisely. On the other hand, as shown in FIG. 7B, the experimental result of this example showed that the inventive cast piece surface temperature measuring device could be used to measure the cast piece surface temperature stably.

According to the above embodiment and example, the above-described cast piece surface temperature measuring device can be used to measure the surface temperature of the cast piece directly and stably for a long time immediately under the mold to continuously cast steel and even under severe conditions where a great quantity of water, vapor and so on exists. In other words, it is possible to measure the surface temperature of a portion in which the cast piece surface temperature is cooled to the Curie point or below in the cooling zone immediately under the mold and in which immediately after that, the cast piece surface temperature increases by recuperated heat directly and stably for a long time. In addition, it is possible to measure the cast piece surface temperature irrespective of size of the cast piece. Accordingly, the cast piece surface temperature measuring device and method of this embodiment can be used to detect operation abnormality such as break-out, unbalanced molten steel flow in the CC mold, and so on.

The present invention is not limited to the disclosed embodiments and examples but may be modified in various ways without departing from the spirit and scope of the invention. For example, in measurement of the cast piece surface temperature, when two inventive cast piece surface temperature measuring devices are respectively placed in both directions of the narrow side of the cast piece immediately under the mold and it is detected that the cast piece surface temperature measured by one of the two cast piece surface temperature measuring device is higher than the surface temperature in normal casting, it is possible to employ a method of recognizing the possibility of break-out and suspending continuous casting to prevent the break-out in advance.

In addition, although it has been illustrated in the disclosed embodiments that the relationship between the predetermined cast piece surface temperature and the induced electromotive force is used to derive the surface temperature of the cast piece 1, relational data indicating a correspondence relationship of the predetermined cast piece surface temperature and the induced electromotive force (for example, data indicating the correspondence relationship shown in FIG. 4) may be used to derive the surface temperature of the cast piece 1.

INDUSTRIAL APPLICABILITY

According to the cast piece surface temperature measuring device and method of the present invention, it is possible to measure the surface temperature of a cast piece stably for a long time even under severe conditions where a great quantity of water, vapor and so on exists.

REFERENCE SIGNS LIST

1: CAST PIECE
2: EXCITATION COIL
3: DETECTION COIL
4: GLASS EPOXY-BASED PIPE
5: POLYESTER-COATED COPPER LINE HAVING 1 MM OUTER DIAMETER
6: POLYESTER-COATED COPPER LINE HAVING 0.3 MM OUTER DIAMETER
7: CONSTANT CURRENT AMPLIFIER
8: OSCILLATOR
9: SIGNAL PROCESSOR
10: LOCK-IN AMPLIFIER

The invention claimed is:

1. A cast piece surface temperature measuring device comprising:
   a magnetic field exciting device which applies an AC magnetic field substantially perpendicular to a surface of a cast piece;
   a magnetic field detecting device which detects the AC magnetic field to detect a magnetic flux varied in response to a surface temperature of the cast piece; and
   a surface temperature deriving device which derives the surface temperature of the cast piece based on an induced electromotive force obtained by detecting the AC magnetic field by the magnetic field detecting device and a predetermined relation data,
   wherein the magnetic field exciting device includes a solenoidal excitation coil,
   wherein the magnetic field detecting device includes a solenoidal detection coil interposed between the surface of the cast piece and the excitation coil,
   wherein the relation data indicates a correspondence relationship between the surface temperature of the cast piece and the induced electromotive force in a temperature range including a predetermined Curie point,
   wherein the cast piece is a slab obtained through a continuous casting by drawing the slab from a bottom of a mold, and
   wherein the magnetic field exciting device and the magnetic field detecting device are arranged in a narrow side of the cast piece immediately under the mold and below a cooling zone to cool the narrow side of the cast piece.

2. The cast piece surface temperature measuring device according to claim 1, wherein the relation data is an equation which indicates the correspondence relationship between the surface temperature of the cast piece and the induced electromotive force.

3. The cast piece surface temperature measuring device according to claim 1, wherein an application frequency of the magnetic field excited by the magnetic field exciting device is equal to or more than 0.5 Hz and equal to or less than 20 Hz.

4. A cast piece surface temperature measuring method which measures a surface temperature of a cast piece using the cast piece surface temperature measuring device according to claim 1, the method comprising:
   applying the AC magnetic field to the cast piece by the magnetic field exciting device and detecting the AC magnetic field by the magnetic field detecting device; and
   deriving the surface temperature of the cast piece by the surface temperature deriving device.

5. The cast piece surface temperature measuring device according to claim 1, wherein the magnetic field exciting device and magnetic field detecting device are aligned with a center of the narrow side of the cast piece.

6. The cast piece surface temperature measuring device according to claim 1, further comprising:
   a glass epoxy-based pipe,
   wherein the solenoidal excitation coil and the solenoidal detection coil are wrapped around the glass epoxy-based pipe.

7. The cast piece surface temperature measuring device according to claim 1, further comprising:
   an oscillator; and
   a constant current amplifier connected the oscillator, the constant current amplifier providing power to the solenoidal excitation coil.

8. The cast piece surface temperature measuring device according to claim 1, wherein the solenoidal excitation coil and solenoidal detection coil are a predetermined distance from the cast piece.

* * * * *